United States Patent [19]
Irving

[11] Patent Number: 5,826,388
[45] Date of Patent: *Oct. 27, 1998

[54] COMPOSITE INSULATING DRAINAGE WALL SYSTEM

[75] Inventor: Michael R. Irving, Adrian, Mich.

[73] Assignee: K2, Inc., Adrian, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 786,666

[22] Filed: Jan. 21, 1997

Related U.S. Application Data

[60] Provisional application No. 60/016,766, May 7, 1996.

[51] Int. Cl.⁶ ....................................... E04B 1/70
[52] U.S. Cl. .................... 52/302.1; 52/267; 52/302.3; 52/407.1; 52/407.5
[58] Field of Search .................. 52/265, 267, 268, 52/269, 302.3, 407.1, 407.4, 407.5, 302.1, 408

[56] References Cited

U.S. PATENT DOCUMENTS

| | | | |
|---|---|---|---|
| 1,961,838 | 6/1934 | Bacigalupo | 52/302.3 |
| 2,298,989 | 10/1942 | Underwood | 52/302.3 X |
| 2,864,251 | 12/1958 | Imbrogno et al. | 52/267 |
| 3,859,766 | 1/1975 | Flotow et al. | 52/268 |
| 4,019,296 | 4/1977 | Jochman | 52/268 |
| 4,114,333 | 9/1978 | Jones et al. | 52/265 |
| 4,277,926 | 7/1981 | Sherman et al. | 52/302.3 |
| 4,478,018 | 10/1984 | Holand | 52/220.1 |
| 4,530,191 | 7/1985 | Boisbluche | 52/407.1 X |
| 4,646,498 | 3/1987 | Schneller et al. | 52/512 X |
| 4,658,557 | 4/1987 | Mulford | 52/407.1 |

FOREIGN PATENT DOCUMENTS

| 1153862 | 9/1983 | Canada | 52/302.3 |
|---|---|---|---|

*Primary Examiner*—Christopher Kent
*Assistant Examiner*—Timothy B. Kang
*Attorney, Agent, or Firm*—Donald R. Fraser

[57] ABSTRACT

A composite drainage wall system is disclosed wherein the system includes a support backing for engagement with a wall substructure, a layer of insulating material adapted to be spaced from the support backing by means to produce spaced apart draining conduits for directing the flow of moisture formed in the drainage conduits, and an outer layer of mesh reinforced mortar.

14 Claims, 1 Drawing Sheet

COMPOSITE INSULATING DRAINAGE WALL SYSTEM

This application is filed under the provisions of 35 U.S.C § 111(a) and claims the benefits of a provisional application Ser. No. 60/016,766 filed May 7, 1996 under the provisions of 35 U.S.C. § 111(b).

BACKGROUND OF THE INVENTION

1. Field of the Invention

The invention relates generally to a building system and more particularly to a composite insulating drainage wall system adapted to cover a wall substructure.

2. Description of the Prior Art

The building industry has employed many types of thermally insulating building panels. These panels are typically non-structural and are applied to structural wall substructures of either wood or steel framing, concrete, masonry, or other approved substrates that comply with the various local building codes.

With the advent of higher and higher fuel costs to heat and/or cool the interior of building structures, attention has been directed toward obtaining lightweight, energy efficient, attractive, and low maintenance building panels.

Reasonable success has been achieved toward these objectives. However, one problem which occurs as the insulating properties improve, deals with the formation of moisture between the panels and/or sheathing materials. Moisture trapped in the interior of a building structure can result in many problems.

SUMMARY OF THE INVENTION

In accordance with the present invention, there is provided a composite insulating drainage wall system adapted to cover a wall substructure. The wall system comprises a support backing provided with an outer surface and an inner surface for engaging a wall substructure; a protective sheeting material superposed and in contact with the outer surface of the support backing; a layer of insulating material provided with an outer surface and an inner surface in facing relation with the outer surface of the protective sheeting material; means disposed between the outer surface of the sheeting material and the inner surface of said insulating material to produce generally spaced apart drainage conduits for directing the flow of moisture formed in the drainage conduits; a layer of mesh material disposed on the outer surface of the insulating material; and a layer of mortar applied over and securely engaging the layer of mesh material to form an outer surface.

It is a primary object of the invention to produce a cavity wall exterior insulation and finish system that may be readily applied to structural exterior wall substructures of either wood or steel framing members, concrete, masonry or other approved substrates that comply with local building codes.

It is a further object of the invention to produce an insulating wall system capable of draining water from the interior of the system.

Another object of the invention is to produce an insulating wall system capable of removing water which is light in weight, energy efficient, and easily adaptable to a variety of architectural styles.

BRIEF DESCRIPTION OF THE DRAWINGS

The above, as well as other objects and advantages of the invention, will become readily apparent to those skilled in the art from reading the following detailed description of a preferred embodiment of the invention considered in the light of the accompanying drawings, in which.

DESCRIPTION OF THE PREFERRED EMBODIMENT

Figure 1:
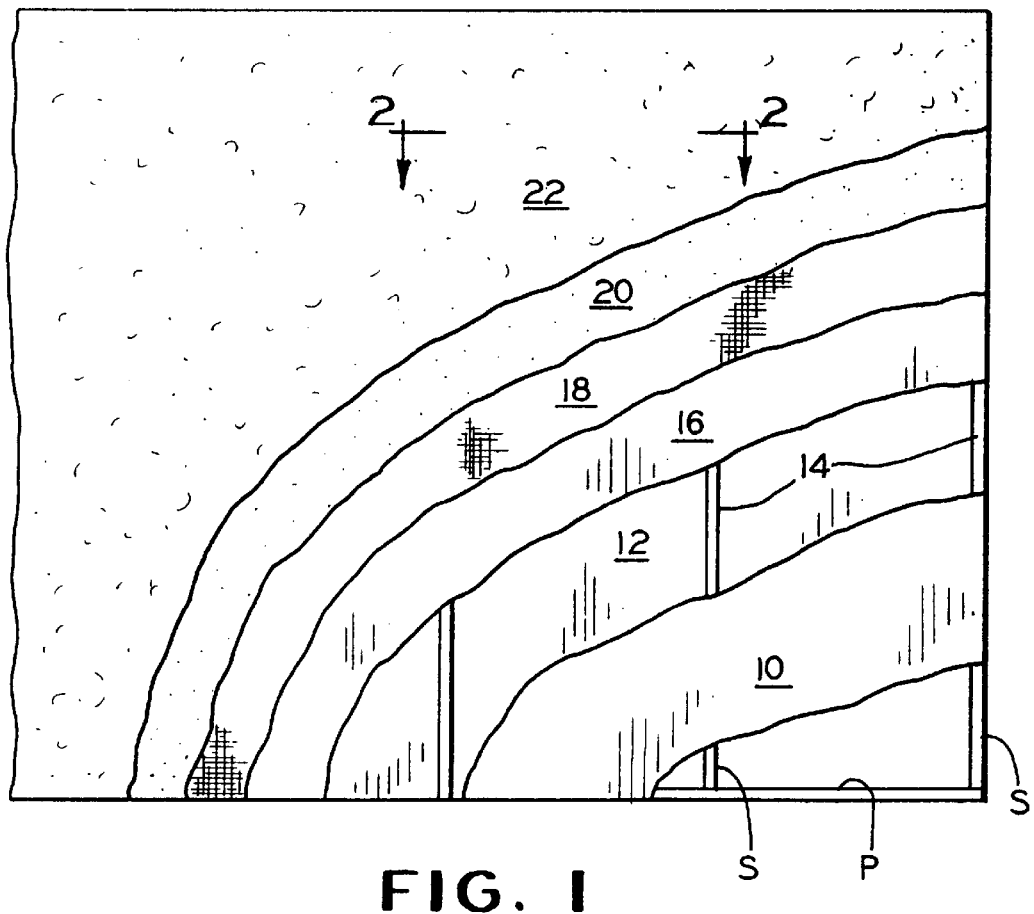
FIG. 1 is an elevational view of a composite insulating drainage wall system constructed in accordance with the present invention with portions cut-away to more clearly illustrate the structure.
Figure 2:
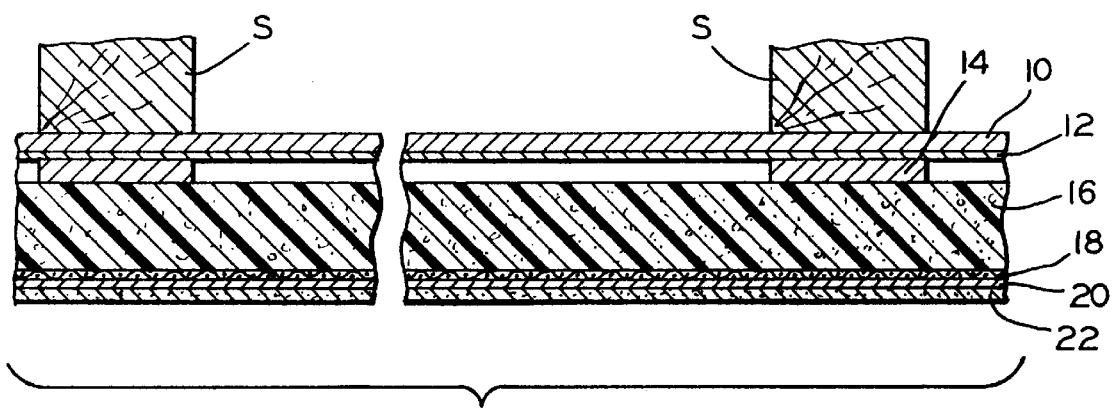
FIG. 2 is a fragmentary sectional view of the system illustrated in FIG. 1 taken along line 2—2 thereof.

The present invention relates to a wall system and more particularly to a cavity wall exterior insulation and finish system (EIFS) which can be applied to structural exterior of a wall substructure of either wood or steel framing, concrete, masonry, or other approved substrates that comply with local building codes.

Referring to the drawings, there is illustrated a portion of a building structure in accordance with the present invention with portions cut-away to more clearly illustrate the various elements.

The substructure includes a series of spaced apart vertically extending wooden studs S, the bottom ends of which are mechanically secured to a horizontally extending base plate P. Typically, the upper ends of the studs S are mechanically secured to a horizontally extending top plate, not shown.

According to the invention, a support backing, or sheathing 10, typically supplied in 4'×8' panels, is disposed against the outer edge surfaces of the studs S and mechanically secured thereto. Excellent results have been obtained by using sheathing 10 manufactured and sold under the trademark THERMO-PLY a registered trademark owned by Simplex Products Division, K2, Inc. Of course, the installation of the sheathing 10 must be accomplished in accordance with the building code of the locality in case the invention is installed.

Following the installation of the sheathing 10, the house wrap sheeting 12 is installed in the following manner. Typically, the installation is commenced at approximately 2 to 3 feet from a corner. The sheeting 12 is then wrapped around the adjacent corner. Nails or staples are suggested to be applied, at locations of the studs S, to hold the sheeting in place.

The sheeting 12 is then caused to completely encircle the building substructure and installation is continued from the bottom-up, lapping all horizontal joints a minimum of 2 inches. Taping the joints with a good quality construction tape such as 3M 8066 Contractor tape is suggested.

At all window and door locations in new construction, before the installation of the windows and doors, the complete house should be wrapped with the sheeting 12. "X"'s are cut at the window and door openings and the excess sheeting 12 is folded to the inside of the openings and fastened through the folded material.

In existing construction, the sheeting 12 is cut around each window and door opening allowing at least ½" between the sheeting 12 and the window or door frame. Tape is typically used to seal all window and door penetrations. The tape must seal and adhere to both the sheeting 12 and the window and door frames to provide an effective water barrier.

Proper construction techniques suggest the installation of a stucco weep screed at the foundation level of the system allowing a minimum of 8" above finish grade. Preferably, the sheeting 12 should be positioned over the weep screed to provide for positive drainage. In the event, the sheeting 12 were not placed over the weep screed, the use of a high quality, high grade construction tape should be used to secure the screed to provide a water-tight seal.

Furring strips 14, cut from the same stock as that used for the sheathing 10, are fastened over the sheeting 12 at the location of the structural studs S (typically 16" on center). The furring strips 14 are also tacked in place, top and bottom.

Next, insulation board 16, typically formed of an approved polyisocyanurate is secured to the assemblage. The board 16 is manufactured in 4'×8' panels and must be butted tightly against adjacent panels without gaps or raised edges. The board 16 must also be aligned so that it does not break at window or door corner locations and is offset from the joints in the sheathing 10.

The insulation boards 16 are secured to the studs S through the furring strips 14 following manufacturer's writing instructions using approved fastening devices and fastening schedule. Typically, sheathing installed with plastic washers requires the fasteners to be installed 12" O.C. vertically and 16" O.C. horizontally in the field of the board and 8" O.C. around the perimeter of the board.

An adhesive base coat 20, such as for example, a product manufactured and sold by Simplex Products Division, K2, Inc. under the trademark FINESTONE Adhesive/Base Coat (A/BC), is applied to the exposed surfaces of the insulation board 16 in nominal thickness requirement for the embedment of an associated reinforcing mesh 18. The FINESTONE adhesive base/coat is an acrylic based material that is mixed at the time of use with Portland cement. The mixture takes on a creamy consistency for smooth, easy troweling. It cures to a strong and durable but flexible coating with high adhesive and weather resistant properties. The thickness of the base coat 20 should be a nominal $\frac{1}{16}$" (1.6 mm) with no mesh color visible. Immediately following the application of the adhesive base coat 20, the reinforcing mesh 18 is embedded into the wet base coat 20. The mesh 18 is embedded into the wet adhesive base coat 20 mixture and the exposed surface is smoothed until the mesh 18 is not visible. Satisfactory results have been obtained by utilizing a reinforcing mesh 18 of the type manufactured and sold by Simplex Products Division, K2, Inc. under the trademark FINESTONE reinforcing mesh. The mesh is formed of strands of glass fibers woven together to form a fortifying sheet of fabric. The glass fibers are typically coated in a resinous material for strength and compatibility with other FINESTONE materials.

In applying the mesh 18, care must be taken to be certain that the material is continuous through all interior and exterior corners extending around the corners a minimum of 12 inches.

The base coat 20, having embedded therein the mesh 18, is allowed to cure a minimum of twenty-four (24) hours.

A second layer of mesh 18 may be used over the cured mesh base coat, if required. The second layer would improve the impact resistance of the system.

Following the curing of the base coat 20, an acrylic finish 22 is applied to the exposed surface of the base coat. It has been found that excellent results can be achieved through the use of an acrylic based textured wall coating such as, for example, FINESTONE Pebbletex Finish manufactured and sold by Simplex Products Division, K2, Inc. Such material is applied to the exposed surface of the cured base coat 20.

The thickness of the coat 20 should be approximately $\frac{1}{16}$", using a stainless steel plastering trowel. The coat 20 is spread uniformly, then scraped down to a thickness equal to the size of the largest contained aggregate. Immediately thereafter, the coat 22 is floated to achieve the final texture.

It will be appreciated that the resultant drainage wall system fabricated in accordance with the foregoing description include:

Single source responsibility for sheathing air/water barrier, and exterior finish system A true cavity wall exterior finish system with secondary water protection Light in weight Economical Energy efficient Attractive Low maintenance Easily adaptable to a variety of architectural styles Amongst the various modifications contemplated by the invention is the substitution of lath, either plastic or metal, for the furring strips 14. The lath can include a mesh-like material which will function to produce drainage conduits for directing the flow of moisture formed therein.

The insulation board 16 may also be comprised of a molded expanded polystyrene material.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A composite insulating drainage wall system in combination with a wall substructure, comprising:
   a) a support backing provided with an outer surface and an inner surface and engaging the wall substructure;
   b) a flexible, conformable, protective sheeting material supported and in contact with the outer surface of said support backing;
   c) a layer of insulating material provided with an outer surface and an inner surface in facing relation with the outer surface of said flexible, conformable, protective sheeting material;
   d) means disposed between the outer surface of said flexible, conformable, protective sheeting material and the inner surface of said insulating material to produce generally spaced apart drainage conduits for directing the flow of moisture formed in the drainage conduits;
   e) a layer of mesh material disposed on the outer surface of said insulating material; and
   f) a layer of mortar applied over and securely engaging said layer of mesh material, to form an outer surface.

2. The combination according to claim 1, wherein the wall substructure comprises a series of spaced apart vertically extending wooden studs.

3. The combination according to claim 1, wherein the flexible, conformable, protective sheeting material contacts the outer surface of the support backing from a location about 2 feet from a corner of the wall substructure.

4. The combination according to claim 1, wherein the flexible, conformable, protective sheeting material completely encircles the wall substructure of a building.

5. The combination according to claim 1, wherein the flexible, conformable, protective sheeting material is folded and fastened to the inside of an aperture through the wall substructure.

6. The combination according to claim 1, wherein said layer of insulating material comprises a polyisocyanurate.

7. The combination according to claim 1, wherein said layer of insulating material is in the form of a substantially rigid board.

8. The combination according to claim 1, wherein said layer of insulating material comprises a molded expanded polystyrene.

9. The combination according to claim 1, wherein said means disposed between the outer surface of said flexible, conformable, protective sheeting material and the inner surface of said insulating material comprises a plurality of spaced apart strips of moisture impervious material.

10. The combination according to claim 9, wherein said strips are formed of said support backing material.

11. The combination according to claim 1, wherein said means disposed between the outer surface of said flexible, conformable, protective sheeting material and the inner surface of said insulating material comprises lath.

12. The combination according to claim 11, wherein said lath comprises a plastic material.

13. The combination according to claim 11, wherein said lath comprises a metal material.

14. The combination according to claim 1, wherein said layer of mortar comprises an acrylic based material containing Portland cement.

* * * * *